(12) United States Patent
Ho

(10) Patent No.: US 10,955,246 B2
(45) Date of Patent: *Mar. 23, 2021

(54) METHOD AND APPARATUS FOR ROUTE PLANNING

(71) Applicant: Waye, LLC, Woodinville, WA (US)

(72) Inventor: William P. C. Ho, Woodinville, WA (US)

(73) Assignee: Waye, LLC, Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,648

(22) Filed: Apr. 20, 2020

(65) Prior Publication Data

US 2020/0249025 A1 Aug. 6, 2020

Related U.S. Application Data

(63) Continuation of application No. 16/242,937, filed on Jan. 8, 2019, now Pat. No. 10,634,502.

(60) Provisional application No. 62/614,951, filed on Jan. 8, 2018.

(51) Int. Cl.
   *G01C 21/20* (2006.01)
   *G01C 21/34* (2006.01)

(52) U.S. Cl.
   CPC ......... *G01C 21/20* (2013.01); *G01C 21/3438* (2013.01); *G01C 21/3453* (2013.01)

(58) Field of Classification Search
   CPC . G01C 21/20; G01C 21/3438; G01C 21/3453
   USPC ...................................................... 701/422
   See application file for complete search history.

(56) References Cited

U.S. PATENT DOCUMENTS

| 6,754,634 | B1 | 6/2004 | Ho |
| 7,127,411 | B2 | 10/2006 | Ho |
| 7,668,727 | B2 | 2/2010 | Mitchell et al. |
| 7,672,855 | B2 | 3/2010 | Peterkofsky et al. |
| 8,438,118 | B2 | 5/2013 | Ho et al. |
| 8,554,467 | B2 | 10/2013 | Ho et al. |

(Continued)

OTHER PUBLICATIONS

Charikar, Moses, Samir Khuller, and Balaji Raghavachari. "Algorithms for Capacitated Vehicle Routing." SIAM Journal on Computing 31.3(2001):665-18. Hoover's Company Prolifes; ProQuest Central. Web. 23 (Year: 2001).*

(Continued)

*Primary Examiner* — Maceeh Anwari
(74) *Attorney, Agent, or Firm* — Perkins Cole LLP

(57) ABSTRACT

The technology disclosed relates to a method for demand-response scheduling that resolves the most undesirable issues intrinsic to the paradigm of the prior art, namely constructing schedules by "Trip by Trip Insertion" onto service vehicles called routes. These issues are classified into Customer Service, On-time Performance, and Efficiency categories. The first step of the 2-step process is to globally build packets to patterns in a library that provide good Customer Service, On-time Performance protection, and Positive Ridesharing Efficiency. The packets are "Mini-Manifests" that meet all constraints, and once formed, are locked from modification by any subsequent scheduling action. The second step is to globally build routes by chaining packets together, controlled by configurable heuristic strategy. The routes that are built directly resolve the undesirable issues.

5 Claims, 9 Drawing Sheets

Common Pick

(56) References Cited

U.S. PATENT DOCUMENTS

| | | |
|---|---|---|
| 10,634,502 B2 | 4/2020 | Ho |
| 2005/0165629 A1 | 7/2005 | Bruns |
| 2005/0246192 A1 | 11/2005 | Jauffred et al. |
| 2006/0224423 A1* | 10/2006 | Sun .................... G06Q 10/0631 705/7.12 |
| 2006/0265234 A1 | 11/2006 | Peterkofsky et al. |
| 2008/0306795 A1 | 12/2008 | Ho |
| 2011/0022535 A1 | 1/2011 | Ho |
| 2017/0031926 A1 | 2/2017 | Katircioglu et al. |

OTHER PUBLICATIONS

Charikar, Moses, Samir Khuller, and Balaji Raghavachari. "Algorithms for Capacitated Vehicle Routing." SIAM Journal on Computing 31.3 (2001): 665-18. Hoover's Company Profiles; ProQuest Central. Web. Feb. 23, 2013.

* cited by examiner

Common Pick

Common Drop

On the Way

Packeting Cluster_Set of 6 Trips for Vehicles with 2 Wheelchair (WC) Capacity

Cluster_Set "Trip-can-cover Trip" Table (Trips Sorted by Trip Length in Descending Order)

Packet Represented as Composite Trip for Chaining

"Composite-can-link-to-Composite" Table (Composite Trips sorted by ETA(Pick) from Earliest to Latest)

Expand Composite Trips for Route Manifest

|  | WC Riders | Amb Riders | Req Time | Pick Win | Drop Win | Trip Length | P-to-D Angle | D-to-P Angle | Pick Lon | Pick Lat | Drop Lon | Drop Lat | ... |
|---|---|---|---|---|---|---|---|---|---|---|---|---|---|
| T1 | | | | | | | | | | | | | |
| T2 | | | | | | | | | | | | | |
| T3 | | | | | | | | | | | | | |
| T4 | | | | | | | | | | | | | |
| T5 | | | | | | | | | | | | | |
| ... | | | | | | | | | | | | | |
| Tx | | | | | | | | | | | | | |

Trip Attributes Table

|  | WC Seats | Amb Seats | Shift Start | Shift End | Garage Lon | Garage Lat | Driver ID | Pvdr ID | Vehicle Type | ... |
|---|---|---|---|---|---|---|---|---|---|---|
| R1 | | | | | | | | | | |
| R2 | | | | | | | | | | |
| R3 | | | | | | | | | | |
| R4 | | | | | | | | | | |
| R5 | | | | | | | | | | |
| ... | | | | | | | | | | |
| Rx | | | | | | | | | | |

Route Attributes Table

Packet 1

| T1 + T2 |

Packet 2

| T3 + T4 + T5 |

Packets – Locked Group of Trips to Meet Ride Quality Criteria

Route 1:   Packet 1 + Packet 4 + Packet 7

Route 2:   Packet 2 + Packet 6 + Packet 123 + Packet 216

Routes – Chained Packets

Trips → Packets → Routes

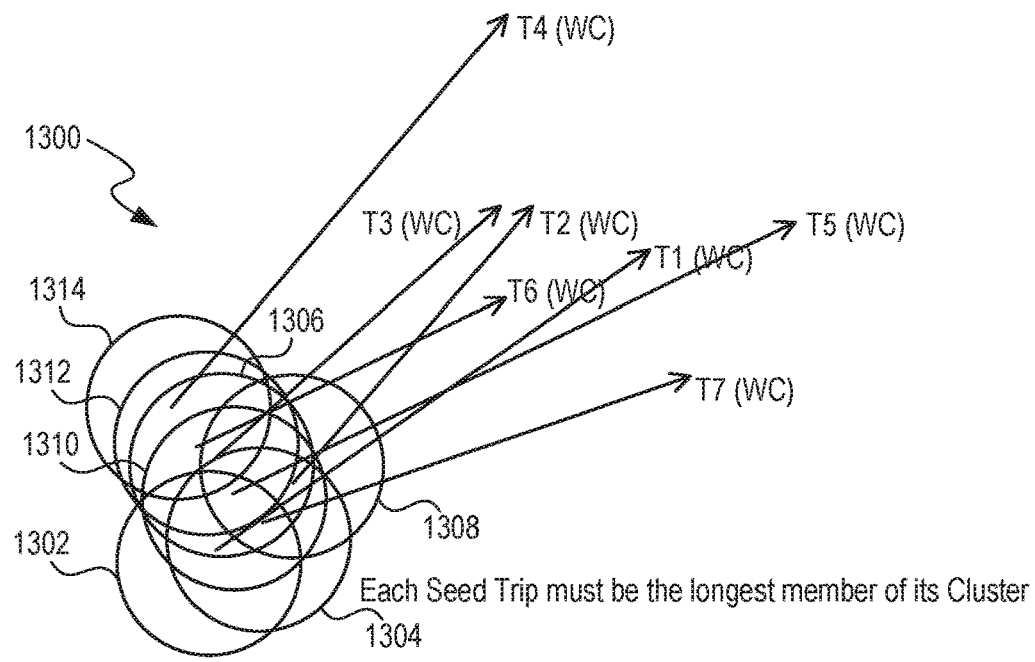

Each Seed Trip must be the longest member of its Cluster

Each Trip is a Seed Trip for a Cluster

FIG. 13

|  | Pass 1 | Pass 2 | Pass 3 | Pass 4 |
|---|---|---|---|---|
| Cluster 1 | T1 + T7 | T7 | T7 | T7 |
| Cluster 2 | T2 + T3 + T6 | T2 + T3 + T6 | -- | -- |
| Cluster 3 | T3 + T6 | T3 + T6 | T6 | -- |
| Cluster 4 | T4 + T6 | T4 + T6 | T4 + T6 | -- |
| Cluster 5 | T5 + T1 + T7 | -- | -- | -- |
| Cluster 6 | T6 | T6 | T6 | -- |
| Cluster 7 | T7 | T7 | T7 | T7 |

Pass 1:
Process Cluster 5
Packet 1 = T5 + T1
T7 not allowed

Pass 2:
Process Cluster 2
Packet 2 = T2 + T3
T6 not allowed

Pass 3:
Process Cluster 4
Packet 3 = T4 + T6

Building Packets from Clusters

FIG. 14

Computer Hardware

METHOD AND APPARATUS FOR ROUTE PLANNING

CROSS-REFERENCE TO RELATED APPLICATION(S)

The present application is a continuation of U.S. patent application Ser. No. 16/242,937, filed Jan. 8, 2019, and claims the benefit of, and priority to, U.S. Provisional Patent Application No. 62/614,951 filed Jan. 8, 2018, both of which applications are herein incorporated by reference in their entireties.

TECHNICAL FIELD

The disclosed technology relates to route scheduling systems in general and in particular to systems and methods for scheduling user requested trips onto transit routes.

BRIEF DESCRIPTION OF THE DRAWINGS

FIG. 13 shows how requested trips can be grouped into a cluster in accordance with the disclosed technology.

FIG. 14 shows how trips within clusters can be grouped into packets and how a table of trips for each cluster is updated as trips are assigned to packets in accordance with the disclosed technology.

DETAILED DESCRIPTION

Figure 1:
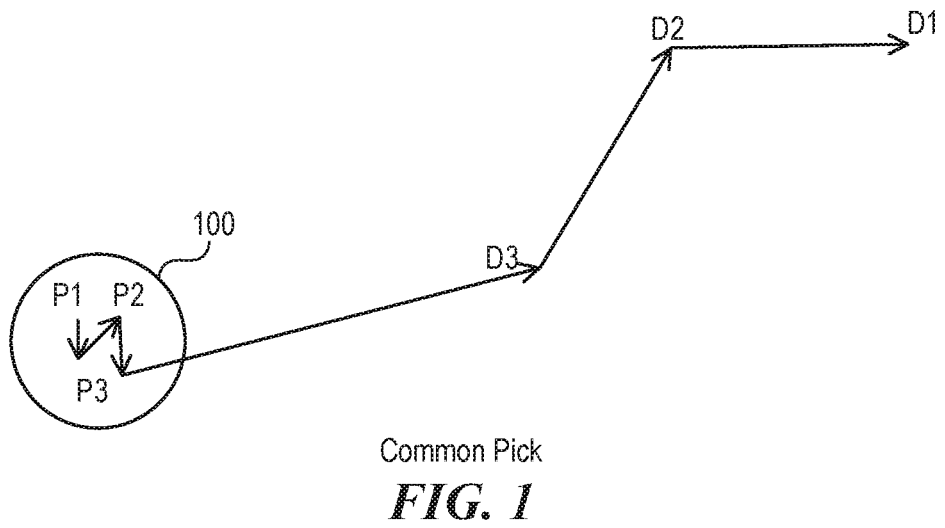
FIG. 1 shows a number of trip requests that are grouped according to a common pick area.

As will be described in detail below, the disclosed technology relates to scheduling systems and in particular to systems for producing route schedules that service user requested trips. Although the technology is described with respect to paratransit requested trips, it will be appreciated that the technology is applicable to any type of scheduling system in which individual trips or shipments are combined on a common carrier. Such trips could be for ridesharing or package/food delivery etc.

In a paratransit system, users request rides from a pickup location to a drop off location within a certain time window. The users may indicate that they will be travelling with a guest or helper and that they may have special needs such as needing a wheel chair etc. It is the job of the scheduling system to develop routes for a fleet of vehicles that can service the requested trips in an efficient manner so that each (or most) of the trips will be completed with certain quality parameters. Examples of quality criteria could be a transit time that is less than some maximum such as 45 minutes, that the scheduled pickup and drop off times are near to the requested times, that the vehicle making the trip be efficiently used (not travelling too far or not travelling long distances while empty), not having too long a route (e.g. overtime for the driver), not having excessive idle times etc. The particular quality criteria can be set by the system operator as rules by which trips are combined into routes as discussed below.

The conventional way of creating route schedules is to insert requested trips into one of a number of routes by testing if the addition of the trip will cause the other trips in the route to violate a quality criteria for the trips. If so, the trip cannot be added to the route. If not, the trip can be inserted. The problem with this one-by-one insertion method is that it invariably causes one or more trips to violate some quality metric.

In contrast to a trip by trip insertion method, the disclosed technology uses a computer to group a number (e.g. one or more) of trips into a packet defining a composite trip that meet all the defined quality metrics. Packets/composite trips are then combined or chained to define a route on a particular vehicle. While the packets may be chained in different combinations while determining the routes, once a packet/composite trip is defined, no additional trips can be added to the packet so that the quality criteria for the trips in a packet are always met.

FIGS. 11A-15 provide a more general overview of the disclosed technology, while FIGS. 1-10 are described in connection with pseudocode showing one way of implementing the disclosed technology with a programmed computer system.

As will be understood by those of ordinary skill in the art, scheduling systems store records of a number of trip requests that are received from users. There are numerous ways of requesting a trip. For example, users may call in a trip request to a call center. Alternatively, a rider may enter a trip request into a web site or enter a trip request on an app. for a mobile computing device. Data for a trip request generally include a requested pickup time and a requested drop off time, a pickup location and a drop off location, the number of riders to go on the trip, any special needs of a rider (e.g. wheelchair needed or special medical needs).

Other trip attributes that are determined for the requested trip are its distance and expected travel time. In one embodiment, the technology described in U.S. Pat. No. 10,094,676 is used to determine predicted travel times between two locations and is herein incorporated by reference in its entirety. In one embodiment, the computer system also determines and stores a direction of travel for the trip as an angular heading from its pickup and drop off locations. Other trip parameters can also be entered and stored for the trip request such as pickup and drop off coordinates in latitude and longitude.

Figure 11A:
FIG. 11A is a representation of a number of requested trips each having data for a number of trip attributes that are stored in a computer memory in accordance with some embodiments of the disclosed technology.
Figure 11B:
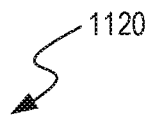
FIG. 11B is a representation of a number of routes each having data for a number of vehicle attributes that are stored in a computer memory in accordance with some embodiments of the disclosed technology.

The trip requests are stored as records in a memory of a scheduling computer. It is not uncommon that a computer system may need to store up to 50,000 trip requests that must be scheduled for any given day. FIG. 11A illustrates a table 1100 of trip requests and their corresponding attributes that are stored in a computer system memory. FIG. 11B shows a table 1120 of vehicle attributes that are stored in a memory of the scheduling system computer. Each vehicle record stores attributes for a particular vehicle. Exemplary attributes could include a vehicle type (e.g. sedan or van), how many wheelchair or ambulatory passengers the vehicle can carry, a shift start and stop time, a provider or operator of the vehicle, a garage location (latitude and longitude), a driver ID, which can be used to determine if the driver of the vehicle has any particular medical training or expertise. Other or different attributes could also be stored (e, g, range of the vehicle if electric etc.).

At a cut off time for the system, the computer analyzes the trip requests (also more simply referred to as "trips") and places them onto routes to be serviced by a particular vehicle. The attributes for a trip must match the attributes of the servicing vehicle. For example, a trip requiring a wheel chair cannot be put on a route serviced by a sedan that can't accept wheelchairs. Once all the trips are associated with a particular vehicle, a route schedule is generated informing the driver of the pickup and drop off locations for each trip to be serviced.

Figure 12:
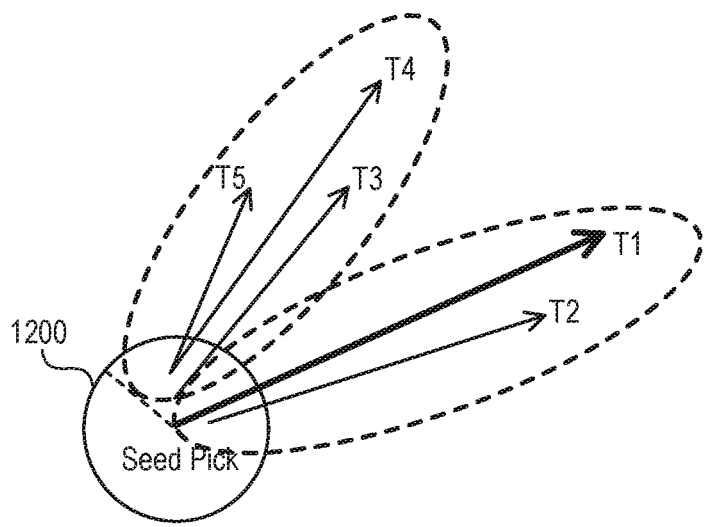
FIG. 12 illustrates how a number of trips are combined to form packets that meet predefined ride quality criteria in accordance with the disclosed technology.

FIG. 12 is a simplified illustration of how trips are scheduled in accordance with the disclosed technology. In this example, there is a cluster 1200 or grouping of a number of requested trips T1-T6 each having particular trip attributes. In one embodiment, the trips are grouped into a cluster because they all originate within some pre-defined geographic radius of one of the trips (the seed trip) and are generally headed in the same direction. Trips within a cluster that meet all the requesters' pickup and drop off time requirements and that are capable of being serviced by one vehicle in the fleet are combined into a "packet" of trips. Packet P1 includes trips T1, T2. Packet P2 includes trips T3, T4, t5.

As used herein, a "packet" of trips is a logical grouping of one or more trips that meet all the quality metrics of the transit system for a trip. Once a packet is assigned a number of trips it is locked and no additional trips can be added to the packet. In this manner, scheduling additional requested trips will not cause a previously scheduled trip to violate any of its trip quality metrics.

The packets of trips are then combined or chained to form a route. For example, Route R1 contains the trips included in packets P1, P4, P7, while Route R2 contains the trips included in packets P2, P6, P123, P216 etc. Each of the trips included in a combined packet does not violate any trip criteria of any other trip in the combination and all the trips in the combined packets can be serviced by the same vehicle for the route.

Figure 4:
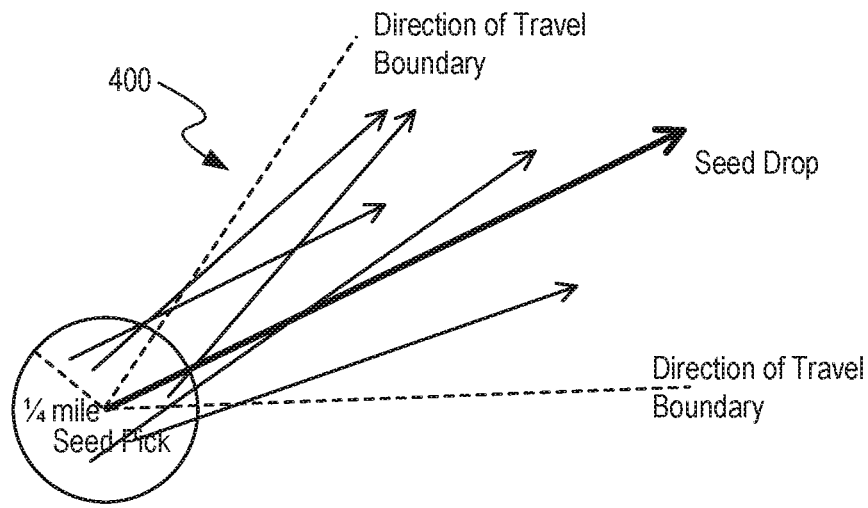
FIG. 4 shows a cluster of trip requests that are generally in a same direction and have pickup locations that are within a preset distance of a seed trip for the cluster in accordance with some embodiments of the disclosed technology.
Figure 5:
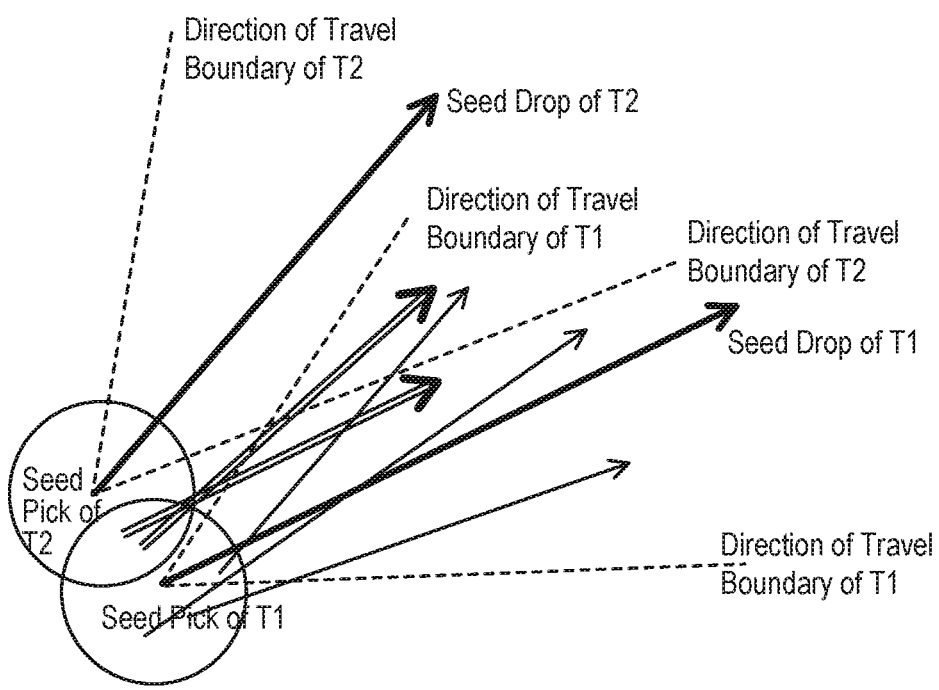
FIG. 5 shows an example of two clusters that contain some of the same trip requests in accordance with some embodiments of the disclosed technology.

In some embodiments of the disclosed technology, trips are combined into packets only if they are generally headed in the same direction. Given a trip's pick up and drop off location, the direction of travel can be computed from a mapping program. In one embodiment, two trips are said to be in the same direction if they travel within a defined angle from a first trip. As illustrated in FIG. 4, a computer defines an angular range 400 (e.g. 45 degrees) from a first trip and determines if another trip's pickup and drop off location is within a geographic area defined by the angular range. If so, the trips are said to be travelling in the same direction. Other angles besides 45 degrees could be used.

FIG. 13 shows a number of clusters 1300 centered around individual trips. Each of the clusters 1302-1314 has a seed trip that is the longest of any trip within a determined radius from the pickup location of the seed trip (e.g. ¼ mile). In the embodiment shown, each trip requires a wheel chair. Once a cluster of trips is defined, the trips in the cluster are analyzed to determine if they can be combined into a single packet.

In one embodiment, trips having nearby pickup or drop off locations and that are travelling in the same general direction are combined in a cluster C. Trips in the clusters are then analyzed to determine if they can be combined into a single packet of trips. FIG. 14 shows a table 1400 that is stored in a memory of the computer system showing trips in a number of clusters C1-C5. Any of the trips in a cluster could potentially be combined into a packet if they meet the capacities of one vehicle in the fleet. For example, Cluster 5 has three trips T5, T1 and T7. If all three trips require a wheelchair and the maximum number of wheel chairs that can be accommodated by any vehicle in the fleet at any one time is two, then one trip cannot be included in the same packet as the other two. In this example, Packet P1 is defined as trips T5 and T1 and trip T7 is excluded. The table of trips is updated as clusters are analyzed. As shown, on the second pass of processing the clusters, trips T1 and T5 are removed from any cluster and processing proceeds to see if the remaining trips defined by the clusters can be combined into packets. In one embodiment, clusters having the largest number of individual trips are processed first. If two clusters have the same number of trips, a second criterium is used and so on, as defined by heuristic rules.

As indicated above, once the trips are included in a packet, they are "locked" and no additional trips can be added to the packet as subsequent trip requests are processed. The packets are then assigned to routes on a vehicle that can service the trips in the packets.

In one embodiment, trips that could possibly be grouped together are identified by trip requests that begin within a predefined geographic radius of each trip and are headed in the same general direction. This is called "common pick" as shown in FIG. 1. The trip requests in each of the clusters are then analyzed to determine if they can be included in single packet.

Figure 2:
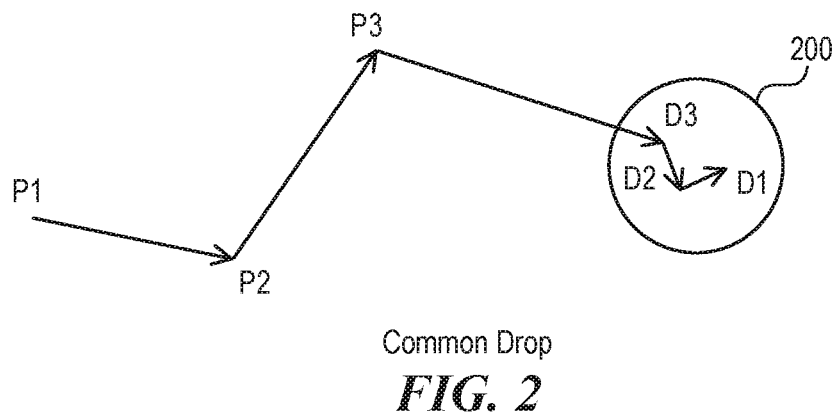
FIG. 2 shows a number of trip requests that are grouped according to a common drop area.

Another way of identifying trips that could possibly by grouped together involves identifying trips with a drop location that is within a predefined radius of a drop location of a seed trip and that arrive from the same general direction (usually 180 degrees from a trip's travel direction). This is referred to as a "common drop" and is shown in FIG. 2. Clusters of trips are then analyzed to determine which trips can be combined in single packet.

Figure 3:
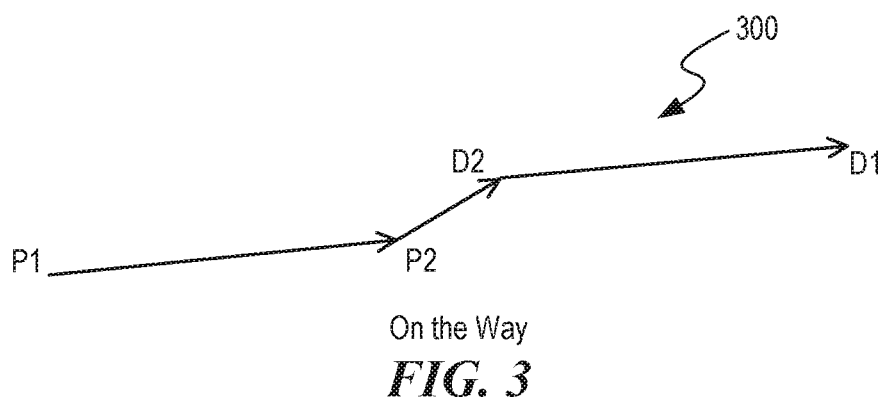
FIG. 3 shows an example of a trip that can be added because it is on the way to another requested trip.

Another way of identifying trips that could possibly be grouped together are trips that are "on the way" of another trip as shown in FIG. 3. Clusters of these trips can be analyzed to determine if the trips can be combined into a single packet.

In one embodiment, trips are first grouped according to a common pick and then analyzed for possible inclusion into a single packet, followed by grouping by a common drop and then analyzed and then grouping by the on the way and analyzed.

Trips that cannot be grouped by the common pick, common drop or on the way criteria are singleton trips that are analyzed separately and may be placed into their own packet for chaining with trips included in other packets. Therefore, it is possible that a packet may only contain one trip.

In most instances, processing is performed in the order of common pick, common drop, on the way and singleton trips. However, the order could be changed if desired.

The trips included in single packet can be analyzed based on the first pick up time and the last drop off time of any of the trips included in the packet. This effectively reduces the number of start and stop time data values that need to be compared when assigning trips to routes. For example, if a packet contains 5 trips, then only two start/stop values (first pick up and last drop off time) need to be analyzed instead of 10 data values. This has the effect of reducing the run time of the system. When reduced a single pick up and drop off time for analysis, the trips included in a packet can be referred to as a composite trip.

In one embodiment, the drop off time for a composite trip must be before the pickup time of another composite trip if the two composite trips are to be chained together. This can speed processing. Other heuristic rules may apply such that a vehicle must arrive at least predetermined time before the pickup time for the second composite trip but not so early that the vehicle exceeds a maximum idle time. The rules for chaining packets can depend on user defined heuristic rules. It is also possible to analyze the number of seats available before the drop off time of the first composite trip to see second composite trip could be added. However, this can involve more calculations.

As will be explained below, chaining composite trips together is performed in much the same manner as adding trips to a packet. In one embodiment, a table stored in the computer system shows all the composite trips that a composite trip can link to and all the composite trips that are able to link to the particular composite trip. Processing can be done in any order but in one embodiment, the table lists composite trips in descending order of trip length (e.g. longer composite trips are processed first followed by processing shorter composite trips). The table changes as composite trips are chained together. In addition, a table of vehicle availability is updated as composite trips are assigned to a particular vehicle.

Figure 10:
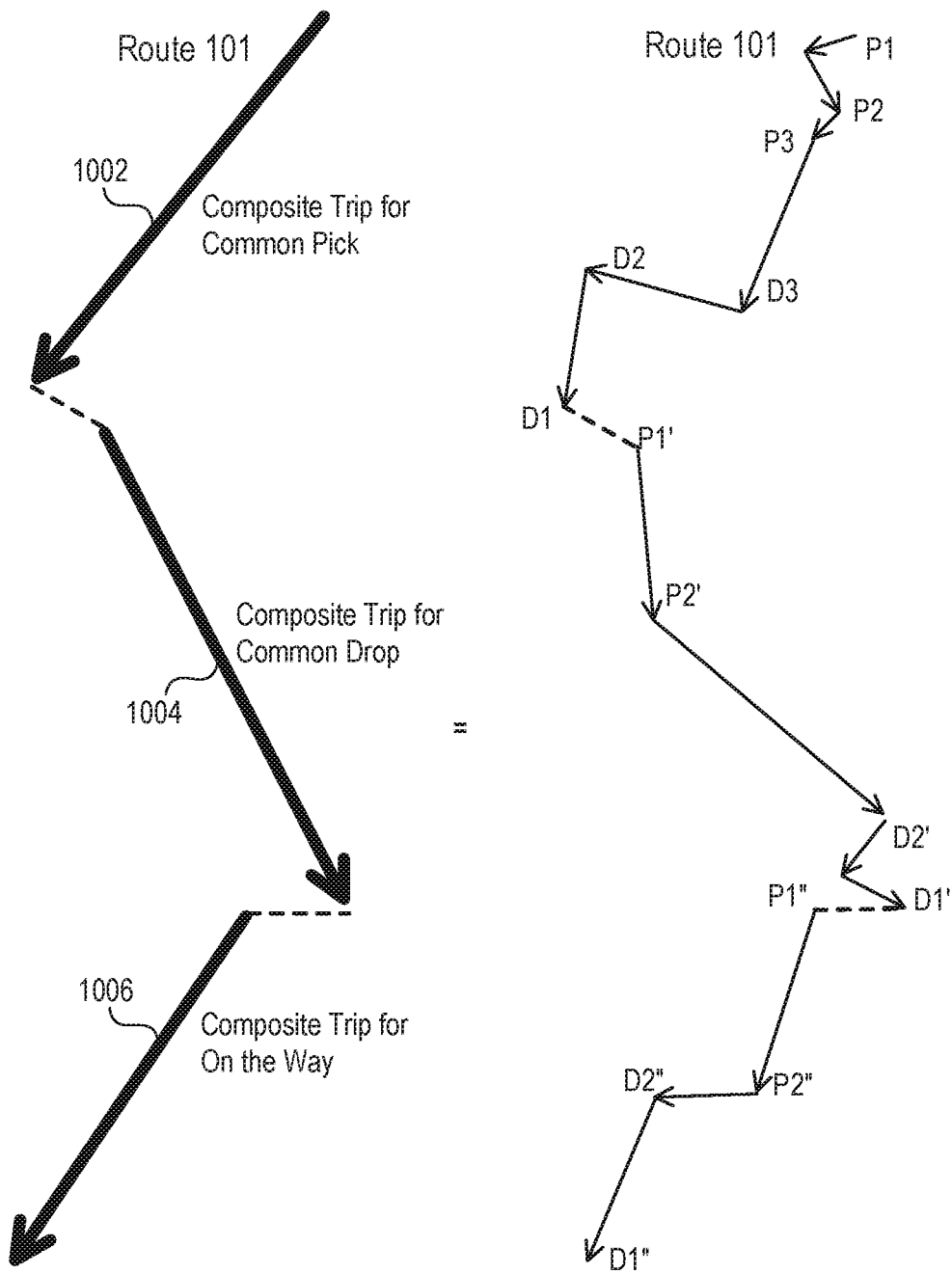
FIG. 10 shows how different composite trips (packets) can be chained to form a route and how the individual trips in each composite trip/packet can be expanded to define the individual trips for the route.

FIG. 10 shows an example of a number of chained composite trips 1002, 1004, 1006 that are joined to form a route 101. After processing all the trips requested, computer system expands the individual pickup and drop off locations for the route 101. The pickup and drop off times form part of the trip schedule that is given to the operator of the vehicle that is assigned to the route.

As will be explained in detail below, the scheduling system of the disclosed technology provides the technical advantage of operating significantly faster than the trip by trip insertion method because it takes a 25,000-50,000 trip puzzle and breaks it down into a number of 10-30 (on average) trip puzzles. The total number of trip requests are divided into clusters of a much smaller number trips that can possibly be combined onto a route. The smaller number of trips included in the various clusters are scheduled by analyzing the trips for inclusion into a packet provided they meet all the member trip quality criteria, meet their requested pickup and drop off times, can be serviced by a single vehicle and meet other criteria set by the operator (e.g. minimal deadhead trip lengths, minimal vehicle idle times etc.) Once a packet is defined, it is a mini-manifest or a mini-route that is not changed by the subsequent processing of other trip requests in the requested trip set. The mini-manifests defined by the packets are then chained together to form possible larger routes that can be serviced by a vehicle. Actual run time improvements for trip request data are set forth below.

One Application Model for Practical Use of Global-View Packeting and Chaining

In the paratransit demand-response model, a trip request set of up to 25,000 or more trips is presented daily to a scheduling system to produce an efficient schedule that sequences the stops onto routes (driver shift and vehicle) subject to a multitude of constraints. These constraints include making picks and drops within each trip's requested 30 minute pick window or 30 minute appointment drop window, not exceeding vehicle ambulatory and wheelchair seating capacities, meeting wheelchair LIFO loading & unloading, meeting driver shift start and end times, using different speeds by time period of day, using different speeds in different geographic speed regions, and so on. The trip set is different every day, so the scheduling problem is new every day.

Prior Art for Demand-Response Scheduling—"Trip by Trip Insertion" Methodology

The predominant systems available to the para-transit demand-response industry are based on a "Trip by Trip Insertion" methodology. The schedule is constructed by inserting the set of Trip requests, one at a time, onto vehicle shifts called Routes. Each Trip has a Pick address and a Drop address and a Requested Pick time or a Requested Drop (Appointment) time.

Given a requested pick time of 7:00, a pick window is independently set to be [7:00, 7:30]. Pick must be made within this window. If the direct travel time from pick to drop is 45 minutes, then a drop window is dependently calculated to be [7:00+45, 7:30+45]=[7:45, 8:15]. But the end of the dependent drop window is extended by a margin to allow ridesharing (e.g. 60 minutes) so the drop window becomes [7:45, 8:15+60]=[7:45, 9:15]. Drop must be made within this window.

Given a requested drop time of 16:00, the drop window is independently set to be [15:30, 16:00]. Drop must be made within this window. If the direct travel time from pick to drop is 45 minutes, then the pick window is dependently calculated to be [15:30-45, 16:00-45]=[14:45, 15:15]. But the start of the dependent pick window is extended by a margin to allow ridesharing (e.g. 60 minutes) so the pick window becomes [14:45-60, 15:15]=[13:45, 15:15]. Pick must be made within this window.

There are three levels of decisions for each scheduling cycle:
Which Trip to schedule next?
Which Route to put the Trip on?
Where to insert the Pick and the Drop on the Route?
Key Attributes for each decision-making level are selected by the service provider. Decisions are made by considering all of the legal candidates at each decision level, and picking the "best" one.

There are two well-known computer science techniques for making such a selection:
Weighted Scoring Function
The Weighted Scoring Function (WSF) creates a single score for each candidate based on that candidate's values for each of the key attributes. Each key attribute can be weighted by an importance factor to magnify its contribution to the final score.

Given a set of candidates, the WSF is applied to each, and the candidate with the highest score is selected.
The following is an example of a WSF for deciding "Which Trip to schedule next?".
Key Attributes are:

| TripType | Wheelchair=1, Ambulatory=0 |
| TripRiders | <count> |
| TripLength | <miles> |

The WSF is Score=10*TripType+8*TripRiders+1*Trip-Length

| Trip 101 | Wheelchair, 1 Rider, 10 miles |
| Trip 202 | Ambulatory, 2 Riders, 20 miles |

Score(Trip 101)=10*1+8*1+1*10=28
Score(Trip 202)=10*0+8*2+1*20=36
Trip 202 is selected as the trip to be schedule next.
Heuristic Filtering Stack (HSF):
The following is an example of an HFS for deciding "Which Route to put the Trip on?".
Key Attributes are:

| RouteType | WheelchairCapable=0, Sedan=1 |
| RouteShiftLength | <hours> |
| RouteTripCount | <count> |

The Filter Stack is: Prefer Sedan Routes
Prefer lightly-loaded Routes (0 to 5 Trips)
Prefer short-shift Routes (0 to 8 hours)
The legal routes that Trip 202 can be inserted on are Route 3001, Route 4001, and Route 5001.

| Route 3001 | Van, 8 hour shift, 5 trips already scheduled onboard |
| Route 4001 | Sedan, 9 hour shift, 5 trips already scheduled onboard |
| Route 5001 | Sedan, 8 hour shift, 3 trips already scheduled onboard |

| Candidate-In | Filter | Candidate-Out |
|---|---|---|
| { 3001, 4001, 5001 } | Prefer Sedan Routes | { 4001, 5001 } |
| { 4001, 5001 } | Prefer lightly-loaded Routes | { 5001 } |

STOP
Prefer short-shift routes
Route 5001 is selected for Trip 202 to be schedule on.

The majority of the systems available to the para-transit demand-response industry use WSF as their selection mechanism in a "Trip by Trip Insertion" process. One commercial system uses HFS as its selection mechanism in a "Trip by Trip Insertion" process.

There are intrinsic weaknesses to the "Trip by Trip Insertion" methodology that have invariably manifested themselves over the history of demand-response scheduling, without solution to date. These are issues that recur every day, for every service provider.

The root cause is that a trip insertion at a later cycle can have negative impact on trips that were inserted in earlier cycles—impact that cannot be foreseen in those earlier cycles. The trip inserted at cycle 1 can be affected by insertions in cycles 2 through 25,000. The trip inserted at cycle 2 can be affected by insertions in cycles 3 through 25,000, and so on.

Customer Service Issues:
Customers ride too long—Suppose Trip 101 has been scheduled onto Route 5001 in Scheduling Cycle 2000. Downstream in cycle 24,011, Trip 879 is selected as the next best trip to be inserted. Because the scheduling options are monotonically diminishing throughout the scheduling process, Route 5001 happens to be the only legal candidate for Trip 879. But inserting Trip 879 to meet its pick time window requires keeping Trip 101 Client(s), and whoever else is onboard at the time, onboard for a longer ride. Clients who are kept onboard for too long a ride complain to the service provider.

"Driving past my stop"—Suppose the above scenario does not make the ride for Trip 101 Client(s) too long. Nevertheless, unloading Trip 101 Client(s) at their destination would take 5 minutes of time to unload. This would cause the pick for Trip 879 to be late, so route goes to pick up Trip 879 Client(s) without stopping first. But driving to Trip 879's pick address goes right by Trip 101's drop address, without stopping. Driving a client right past his/her stop, and having to double back to make the drop, will cause the client to complain to the service provider. This is a recurring issue for every service provider. If the driver decides to stop to make the drop anyway, Trip 879's Client(s) are likely to be picked up late. Clients who are picked up late complain to the service provider.

On-Time Performance Issues:
ETA's late in the time window—Suppose when Trip 101 is inserted onto Route 5001 at Scheduling Cycle 2000, the ETA to make the pick is in the first 5 minutes of the 30 minute pick window. But at Scheduling Cycle 3001, Trip 535's pick is inserted before trip 101's pick as the best constructive step. Scheduling Trip 535's Pick onto Route 5001 pushes Trip 101's Pick ETA to the last minute of its legal pick window. This is perfectly legal, but on the day of service, there is no margin for delay. If making any of the preceding stops before Trip 101's pick causes a delay, whether by traffic congestion or by longer than planned load or unload time, Trip 101 will be picked up late. Clients who are picked up late complain to the service provider. ETA's are never completely set until after the last scheduling cycle. ETA's late in their windows are more at risk of being late on the day of service.

Long Deadheads—As stated earlier, the scheduling options are monotonically diminishing throughout the scheduling process. Towards the end, there may be trips that has only one route option left, but that route must travel 20 miles empty (i.e. Deadhead) across the service area to make the pick. The scheduling system will make that decision instead of putting those trips onto a wait list as "Not Schedulable". Longer deadheads are more subject to traffic congestion by their length across multiple neighborhoods, so the probability of being late to make the pick is increased.

Efficiency Issues:
Driving a long way to make a pick—In the description of deadheads above, there is a secondary weakness. The deadhead miles and the deadhead drive time are unproductive use of the vehicle's service capacity. For an urban area, the average speed might be 10 miles per hour. Driving 20 miles to make a pick will waste 2 hours of vehicle service hours. The extra 20 miles contributes to the "wear and tear" on the vehicle and speeds up the need for maintenance service.

Sending 2 vehicles when 1 is enough—Suppose Trip 101, who is going from home to the senior center, is scheduled on sedan Route 5001 at Scheduling Cycle 2000. Later at Scheduling Cycle 3011, Trip 367, who is going from home to the rehab facility in the same neighborhood as the senior center, is selected as the next trip to schedule. Trip 367's client lives next door to Trip 101's client and is requesting to travel at approximately the same time as Trip 101's client. But Trip 367 is for a wheelchair client, so cannot be scheduled onto sedan Route 5001. Instead, Van Route 6002 arrives at the same time as Sedan 5001 in the same neighborhood for them to make the two picks. And Van 6002 has empty ambulatory seats that could have accommodated Trip 101's Client(s). The avoidable service miles and service hours for Sedan Route 5001 wastes service capacity that could have been valuably used. The other clients who are onboard Route 5001 are also inconvenienced to ride a longer time than necessary.

Over-packed and under-packed Routes—After scheduling is complete, there is likely to be a mixture of well-packed routes, over-packed routes, and under-packed routes since. Like ETA's which are never completely set until after the last scheduling cycle, the density of the route is not completely known until after the last scheduling cycle. Over-packed routes require that the manifest is perfectly executed. Any slight slowdown at an earlier stop causes the rest of the stops to be at risk of running late. There is no margin for delay. On the day of service, this forces dispatchers to take corrective action in real-time. Experientially, without having time to consider the consequences of those actions, efficiency is lost. "Trips per Service Hour" is the primary metric of efficiency. The "Trips per Service Hour" after the day of service is completed may be as much as 25% lower than the "Trips per Service Hour" at the start of the day of service. Under-packed routes typically have large gaps of idle time between early work and later work. These gaps are wasted service hours where the driver sits and the vehicle idles.

Global-View Packeting and Chaining for Demand-Response Scheduling

The technology disclosed relates an alternative method to "Trip by Trip Insertion" for demand-response scheduling. The new method offers solutions to the recurring issues faced by service providers in Customer Service, On-time Performance, and Efficiency that is intrinsic to "Trip by Trip Insertion".

The new method can use either WSF or HFS to make decisions. HFS is used hereafter to illustrate decision-making.

The method is a 2-step process:
Global-view Packeting
Global-view Chaining

Global-View Packeting

As opposed to the system that determines a trip schedule by inserting individual trip requests onto a number of routes, the disclosed technology groups requested trips into packets, before considering which individual route the packet should be scheduled onto. No trips are combined unless together they can meet the defined quality metrics for each member trip. In one embodiment, requested trips are not combined into groups unless they have pickup locations that are relatively close to each other, have pick up windows that are relatively close to each other in time, are all headed in the same general direction (angular direction) of each other, and there is constructed a sequencing of the stop events that meet all constraints—ETA's within stop windows, some vehicle shift and capacity, LIFO loading and unloading, travel speeds, etc. Packets are therefore stored in a memory of the computer as a group of trips with a specific sequencing of stop events that guarantee that all customer quality metrics for each member trip are met. Once trips are combined into packets, no additional trips are added to a packet, thereby ensuring that late additions do not cause performance degradations. No subsequent packeting actions can impact any previously constructed packets.

Once the packets are determined, they are chained together to form routes. In one embodiment, packets are only chained together if determined quality metrics are met. For example, packets are not combined if the combination introduces too much dead time in the chaining of the packets—i.e. the last drop off from one packet takes too long a time to get to the first pickup of the next packet. In addition, packets are not combined if the deadhead trip distance (e.g. the distance driven by a vehicle with no passengers) required to chain them together is too great. The allowable deadhead time and deadhead distance are parameters to set by the service provider. They prevent chaining that might be "legal", but are not "good", since time and distance while driving empty is essentially unused resource.

Once packeting combines individual trips into packets, and chaining only needs to work with packets, the size of the scheduling problem is effectively reduced thereby providing the technical effect of reducing the number of calculations that must be performed and decreasing the time required to compute a solution schedule. For example, packeting may combine 25,000 trips into 12,500 packets for chaining to work with.

Instead of constructing the schedule by "Trip by Trip Insertion" onto routes, Packeting does not assign any trip to any route at all. Instead, packeting is globally considering all of the trips to be scheduled to search for instances that satisfy a pattern from an extensible Library of Trip-grouping Patterns. By their definition, these patterns provide positive ridesharing (Efficiency), ETA's firmly locked in the middle of their time windows (Customer Service & OTP protection), and almost direct rides for each client (Customer Service).

Patterns in the Library Include:

Common-Pick Pattern (FIG. 1)—A Common-Pick group 100 is a set of trips that have their picks in the same small neighborhood, with pick windows at approximately the same time, and headed outward in approximately the same direction of travel. These trips should be packeted into as few groups (packets) as possible to be eventually schedule onto routes after packeting. If required by vehicle configuration, the "last in, first out" (LIFO) sequence of stops is all picks followed by all drops: Pick-Pick . . . -Drop-Drop.

Common-Drop Pattern (FIG. 2)—A common-drop group 200 is a set of trips that have their drops in the same small neighborhood, with drop windows at approximately the same time, and headed inward from approximately the same direction of travel. These trips should be packeted into as few groups (packets) as possible to be eventually schedule onto routes after packeting. If required by vehicle configuration, the LIFO sequence of sops is all picks followed by all drops: Pick-Pick . . . -Drop-Drop.

On-the-Way Pattern (FIG. 3)—An On-the-Way group 300 is a host trip that can pick and drop a guest trip in between its own pick and drop at the expense of incurring a few added miles. The guest trip is headed in approximately the same direction of travel, and "rides almost for free" with the few added miles (positive ridesharing). The guest trip may recursively host its own guest trip, and so on. The LIFO sequence of stops is all picks followed by all drops: Pick-Pick . . . -Drop-Drop.

The order of considering patterns in packeting is configurable and can be ordered by the service provider. From a practical standpoint, the standard order is Common-Pick, Common-Drop, and On-the-Way. This is due to experience that the patterns are ordered by empirical frequency of appearance in the daily trip set from samples from many para-transit sites. The library of patterns (e.g. how trips can be combined) is extendable if other groupings of trip requests can be serviced by a vehicle and can meet all trip quality metrics.

Pre-Packeting—Variables Initialization (referenced in pseudo-code below):

Each Trip $T_X$ has appropriately set key attributes such as:

| T_WC | Wheelchair seats required |
| T_Amb | Ambulatory seats required |
| T_PWin_St | Pick window start time |
| T_PWin_En | Pick window end time |
| T_DWin_St | Drop window start time |
| T_DWin_En | Drop window end time |
| T_PD_direct | Pick-to-Drop "Direction of Travel" |
| T_DP_direct | Drop-to-Pick "Direction of Travel" |
| T_Length | Direct travel miles from Pick to Drop |
| T_DirRide | Direct ride time from Pick to Drop (travel + load + unload times) |
| T_PETA | ETA of Pick (initialize to T_PWin_St if Pick-time requested or T_DWin_St-T_DirRide if Drop-time requested) |
| T_DETA | ETA of Drop (initialize to T_PWin_St+T_DirRide if Pick-time requested | or
T_DWin_St if Drop-time requested

Each Trip $T_X$ also has variables to be filled by Clustering:

| Cluster_Set | Array to contain Trips that could be in the current Pattern with Tx |
| CS_Count | Size of Tx's Cluster_Set |

Each Cluster_Set has a set of key attributes that will be used in selecting the next Cluster_Set to process during packet building. Attributes are all initialized to appropriate initial values. Some examples are:

| CS_WCs | Wheelchair members count (initialized to 0) |
| CS_Ambs | Ambulatory members count (initialized to 0) |
| CS_Longest | Longest trip length among members (initialized to 0) |
| CS_Earliest | Earliest pick time among members (initialized to 24:00) |

Each Trip $T_X$ also has variables for use in packet building. If Packet_ID=0, $T_X$ has not yet been committed to any Packet—i.e. it is "available" to clustering and Packet-Building:

| Packet_ID | Packet ID (initialized to 0) |
| Packet_Type | Packet type (initialized to 0) |
| Packet_Set | Array to contain trips in Packet with Tx |
| PK_Count | Size of Tx's Packet_Set |
| PK_Length | Length of longest member in Packet_Set |
| STATUS | Status during Packet-Building |

After pre-packeting, packeting is done in two steps for each Pattern $P_X$, in its turn:

| Clustering | (Px) |
| Packet-Building | (Px) |

So packeting for the order of Patterns Common-Pick, Common-Drop, and On-the-Way would be:

| Clustering | (Common-Pick) |
| Packet-Building | (Common-Pick) |
| Clustering | (Common-Drop) |
| Packet-Building | (Common-Drop) |
| Clustering | (On-the-Way) |
| Packet-Building | (On-the-Way) |

Step 1.—Method for Clustering(Pattern $P_X$)

Per Trip as Seed Trip $T_S$, select from the rest of the Trips those that could be in the Pattern $P_X$ with $T_S$. This is called the Cluster_Set of $T_S$ (FIG. 4). By definition, $T_S$ is also a member of its own Cluster_Set.

The Common-Pick Pattern is used hereafter to illustrate Clustering.

The requirement in some Packet Patterns:

$T_C$'s direct travel miles <=$T_S$'s direct travel miles (i.e. the seed trip is required to be the longest trip in a cluster).

Is an optional one to reduce the size of Cluster_Sets without diminishing the space of possible packets that can be built by Packet-Building. If $T_C$'s (e.g. a potential trip to be added to a cluster) direct travel miles exceeds $T_S$'s, then $T_C$ is not included in $T_S$'s Cluster_Set. But when $T_C$ is in turn considered as the seed trip, $T_S$ meets this requirement, and may be contained in $T_C$'s Cluster_Set, if it meets all other conditions. So the possibility of $T_C$ and $T_S$ being selected to be in the same packet is not eliminated by this requirement. This optional requirement speeds up the packeting process. The program implemented for the clustering method includes it as a conditional function with an ON/OFF parameter switch that can be set by the operator.

Step 2.—Method for Packet-Building (Pattern $P_X$)

Packet-Building processes the Cluster_Sets one by one to build packets according to Pattern $P_X$. Once a packet is built, the Packet_ID of each member trip is filled with the same ID (from an ID Generator that increments once per new packet) and the Packet_Type of each member is set to $P_X$. All member trips of each new packet are thereby rendered "unavailable" to Packet-Building for subsequent Cluster_Sets for the same pattern, and for subsequent Cluster_Sets for subsequent patterns in the processing order.

The heuristically determined order to process patterns, and order to process Cluster_Sets within each pattern determine the set of packets that are built. The scheduling system of the disclosed technology does not specify a best order to process Patterns, nor a best order to process Cluster_Sets within each pattern. The latter is implemented as a Heuristic Filtering Stack (HSF) mechanism.

The key attributes of unprocessed Cluster_Sets must be updated after processing a Cluster_Set, since some or all of their members may be included in packets built for the last Cluster_Set and are therefore no longer available.

Only Cluster_Sets with CS_Count>1 are submitted to Packet-Building.

Packet-Building creates "Pieces of Work" (i.e. "Mini-Manifests") that meet all of the constraints of the demand-response service, but without considering the specific route it should be scheduled onto. These constraints include making picks and drops within each trip's requested 30 minute pick window and/or 30 minute appointment drop window, not exceeding all route vehicle ambulatory and wheelchair seating capacities, meeting wheelchair LIFO loading & unloading, using different speeds by time period of day, using different speeds in different geographic speed regions, and so on. Each packet has at least one route it can be assigned to, to be served on the day of service.

Figure 6:
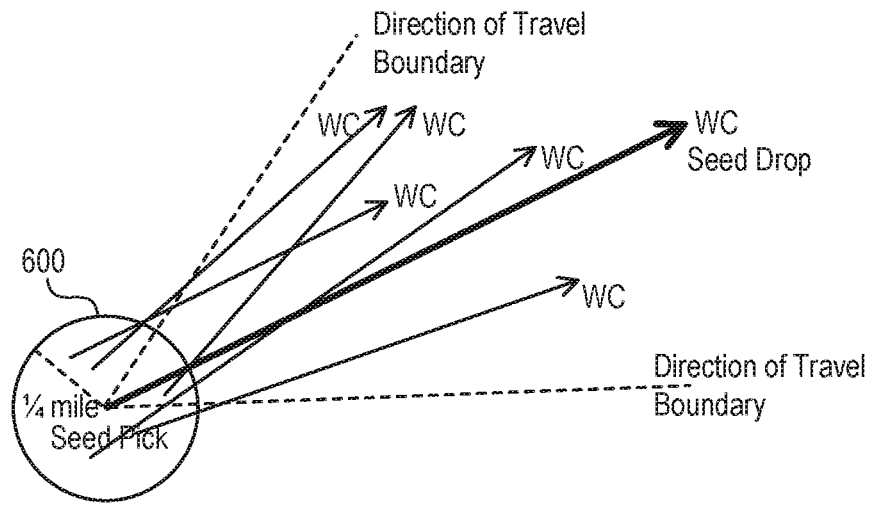
FIG. 6 shows a cluster of trip requests where at least one rider on the trip requires a wheel chair.

Packet-Building may build more than one packet from a Cluster_Set (FIG. 6). For example, suppose a Cluster_Set 600 contains six member trips, and all six are single wheelchair Trips. Suppose vehicles have two Wheelchair seats. Then there may be up to three packets generated by Packet-Building from that Cluster-Set.

In one embodiment, the only constraint not considered is whether there are enough routes that could service all the packets. But that is the same issue with any para-transit scheduling. Trips or packets that cannot be scheduled are put onto a wait list for special processing—e.g. sent to non-dedicated providers, such as taxis or TNC's (Transportation Network Companies such as Uber or Lyft), or inserted the day of service as trip cancellations are called in.

The Common-Pick Pattern is used hereafter to illustrate Packet-Building.

Because member trips of a Cluster_Set fit the Common-Pick Pattern, each client's ridetime is almost a direct ride (Customer Service), each client's Pick ETA and Drop ETA are comfortably and controllably away from the end of their respective time windows (OTP on time protection), and the positive ridesharing of the member trips is maximized (efficiency) by nature of the pattern. Once a packet is formed, no other pick or drop can be inserted into the packet by any subsequent scheduling action. The ETA's of the member trips are locked and each client's customer experience is locked. The "Trip by Trip Insertion" myopia is eliminated.

The trips in the Cluster_Set that are not put into a packet by Packet-Building remain "available" to Packet-Building for subsequent cluster sets in the current pattern, and for cluster sets in subsequent patterns. Their Packet_ID remains 0 and Packet_Type remains 0.

Packet-Building (Common-Pick)

If there are unprocessed Cluster_Sets left with CS_Count>1, select the next Cluster_Set for Packet-Building by HFS_P1 below.

Figure 7:
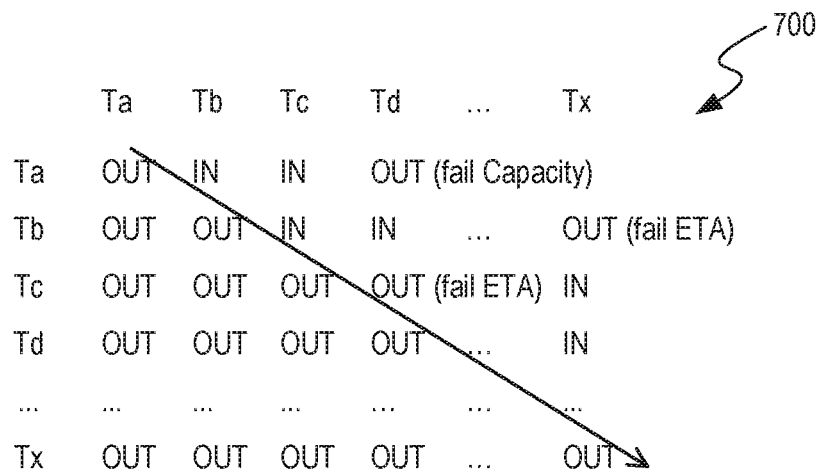
FIG. 7 is a table that shows whether various trips can be combined into a single packet accordance with some embodiments of the disclosed technology.

Mark STATUS for each trip in the Cluster_Set as IN.
Initialize Packet_Set for each Trip to contain itself, and PK_Count=1.
Build Table "T1 CanCover T2" of all trips in Cluster_Set by all trips in Cluster_Set (FIG. 7). An example table 700 is shown in FIG. 7.
"T1 CanCover T2" if:
Temporarily combine T1 and T2 Packet_Sets and sort by member T_Length (descending order).
Build a LIFO sequence with the members— Pick- . . . -Pick-Drop- . . . -Drop.
Test that all ETA's of stops in the LIFO sequence have at least <3> minutes buffer from the end of their windows.
Test that there is some route:
The combined wheelchair seats and combined ambulatory seats needed for T1 and T2 do not exceed some route vehicle's available wheelchair and ambulatory seats.
The LIFO sequence fits within that route's shift.
If T1 and T2 pass all the tests, then T1 CanCover T2.
If T1 CanCover T2, Table[T1,T2]=YES, else Table[T1,T2]=NO.
NOTE: Below, only consider $T_X$ and $T_Y$ if STATUS of $T_X$=IN and STATUS of $T_Y$=IN.
While there are still Table[$T_X$,$T_Y$]=YES:
Pick $T_X$ that can cover some $T_Y$'s by HFS_P2 below (row Table[$T_X$,] has some YES).
Pick $T_Y$ among $T_Y$'s that $T_X$ can cover by HFS_P3 below.
Add $T_Y$'s Packet_Set to $T_X$'s Packet_Set, and $T_X$'s update PK_Count.
Sort $T_X$'s Packet_Set by member T_Length (descending order).
Build LIFO sequence with $T_X$'s Packet_Set— Pick- . . . -Pick-Drop- . . . -Drop, and update:

T_WC and T_Amb of $T_X$ to represent the packet
T_PWin_St and T_Pwin_En=that of first pick in LIFO sequence
T_Dwin_St & T_Dwin_En=that of last drop in LIFO sequence
PK_Length=that of longest member.
Update T_PETA and T_DETA of each member Trip.
Mark $T_Y$ OUT and set row Table[$T_Y$,]=NO and column Table[,$T_Y$]=NO.
Update row Table[$T_X$,] and column Table[,$T_X$]: if YES, re-test to see if still YES (if NO, it is still NO).
For all $T_X$ with STATUS=IN and PK_Count>1 (i.e. a Packet), mark members' Packet_ID=ID$_{NEXT}$ and Packet_Type=P$_X$.
Update the information for all unprocessed Cluster_Sets left by updating the Cluster_Set to exclude members that are no longer "available", updating CS_Count, and all key attributes to reflect the updated membership.
Go to Step 1.
HFS_P1—Select next Cluster_Set for Packet-Building to process:
Prefer Cluster_Sets with membership count within <2> of the maximum membership count among all remaining candidate Cluster_Sets (CS_Count>=MAX_Count−2). MAX_Count is dynamically calculated in this filter.
Prefer Cluster Sets with wheelchair members within <1> of the maximum wheelchair members among all remaining candidate Cluster_Sets (CS_WCs>=MAX_WC−1). MAX_WC is dynamically calculated in this filter.
Prefer Cluster_Sets with longest member within <2> miles of the longest member among all remaining candidate Cluster_Sets (CS_Longest>=MAX Length−2). MAX Length is dynamically calculated in this filter.
Pick one.
HFS_P2—Select $T_X$ that can cover some $T_Y$'s:
Prefer $T_X$'s with highest PK_Count.
Prefer $T_X$'s with longest PK_Length.
Prefer $T_X$'s with T_WC>0.
Pick one.
HFS_P3—Select Tv among $T_Y$'s that $T_X$ can cover:
Prefer $T_Y$'s with longest PK_Length.
Prefer $T_Y$'s with highest PK_Count.
Prefer $T_Y$'s with T_WC>0.
Pick one.

There are similar Packet-Building (Common-Drop) and Packet-Building (On-the-Way) functions.

After Packet-Building for all patterns is complete, all multiple trip packets have been constructed. The remaining "available" trips are made into single trip packets by assigning each "available" Trip's Packet_ID=ID$_{NEXT}$ and Packet Type=SINGLETON. STATUS of each "available" Trip is still IN, and T_PETA and T_DETA are set appropriately from initialization.

The overall number of entities to be chained together into routes has been greatly reduced, typically to approximately one-half the number of original trips.

Global-View Chaining

Figure 8:
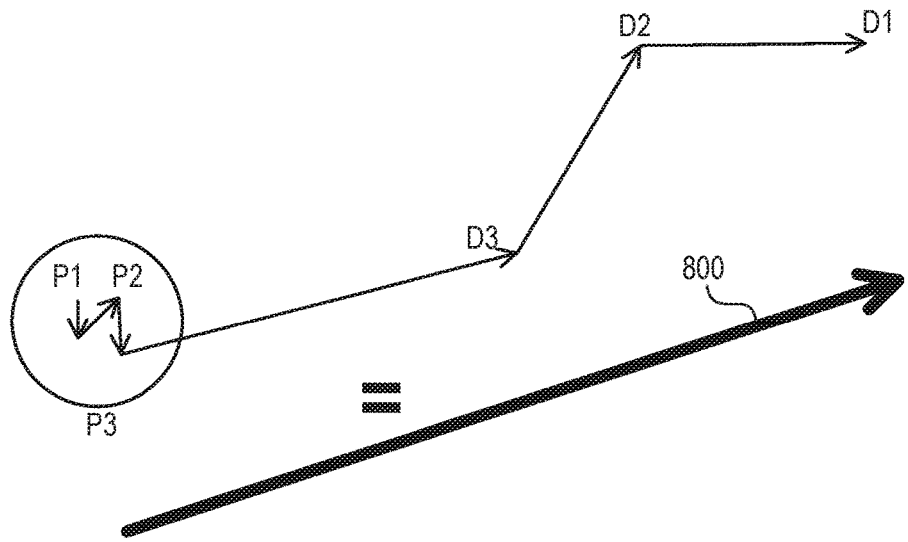
FIG. 8 illustrates how three trip requests with three different pickup locations and three different drop off locations are combined into a single packet which represents a single composite trip, in accordance with some embodiments of the disclosed technology.

For chaining, each packet leads to creation of a Composite Trip 800 (Composite) that it is assigned to (FIG. 8). The Composite's ID is set to have the same value as the Packet's ID. The pick of the composite is the 1$^{st}$ Pick of the Packet's LIFO sequence, and the drop of the composite is the last drop of the packet's LIFO sequence. Both pick and drop have windows and addresses. The service time for the composite is calculated by the ETA of the composite's drop minus the ETA of the composite's pick from the packet's LIFO sequence. The wheelchair client count is T_WC, kept current as the maximum number of wheelchair clients onboard at any time within the packet. The ambulatory client count is T_Amb, kept current as the maximum number of ambulatory clients onboard at any time within the packet. Chaining constructs routes by successively linking pairs of composites together, from a global view perspective.

Pre-Chaining—Variables Initialization of composite key attributes (referenced in pseudo-code below):

Each Composite has appropriately set key attributes such as:

| | |
|---|---|
| C_ID | Composite ID (initialize to Packet_ID of the Packet assigned to it) |
| C_Packet_Set | Array to contain packets in composite (initialized to 1 Packet) |
| C_PK_Count | Size of C_Packet_Set (initialized to 1) |
| C_Pick | $1^{st}$ Pick of $1^{st}$ packet in C_Packet_Set |
| C_Drop | Last Drop of last packet in C_Packet_Set |
| C_ETA_St | ETA of first pick of first packet in C_Packet_Set |
| C_ETA_En | ETA of last drop of last packet in C_Packet_Set |
| C_Span | Span of Composite = C_ETA_En-C_ETA_St |
| C_WC | Maximum WC seats required among C_Packet_Set Packets |
| C_Amb | Maximum Amb seats required among C_Packet_Set Packets |
| C_RouteID | Route Composite is assigned to (initialized to 0) |
| C_STATUS | Status during Chaining (initialized to IN) |

Each RouteNehicle has appropriately set Key Attributes such as:

| | |
|---|---|
| R_Shift_St | Start of shift |
| R_Shift_En | End of shift |
| R_Shift_Length | R_Shift_En- R_Shift_St |
| R_WC | Wheelchair seats |
| R_Amb | Ambulatory seats |
| R_STATUS | Status during Chaining (initialized to IN) |

In one embodiment, there are three key control parameters to chaining. The first is MaxDeadhead=the maximum allowed connective deadhead miles to link two Composites. The second is MaxWait=the maximum allowed wait time at the prospective Linkee Pick to link two composites. The third is MinWait=the minimum required wait time at the prospective linkee pick to link two composites.

Figure 9:
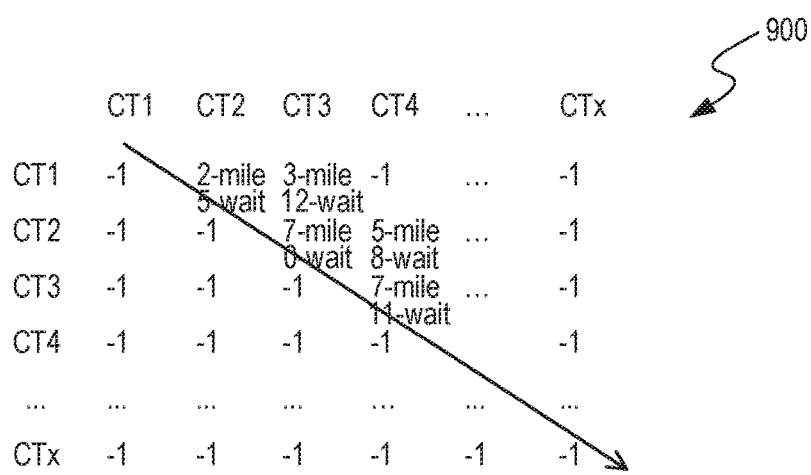
FIG. 9 is a table showing whether composite trips (e.g. packets) can be chained together in accordance with some embodiments of the disclosed technology.

In one embodiment, chaining creates a Linkage Table 900 of all Composites X all Composites (FIG. 9). Each entry Table[$C_F,C_T$] contains two values—ConnectiveDeadhead between $C_F$ and $C_T$, and ConnectiveWait time at $C_T$.

As a consequence of the selected linkage, another composite may lose its last candidate linkage in which it would have been a Linkee, and thereby become a head. It is assigned to an available route as the first step of the next constructive cycle. If no route is available any longer, it is marked as "Not Schedulable" and placed on a wait list. This process continues until the Linkage Table is empty. Then scheduling is complete. At that point the wait list is composed of efficient "Pieces of work" that can be bid out to overflow capacity resources such as brokers, taxis, and TNC's like Uber and Lyft.

For each cycle of chaining, a linkage between a linker and a linkee is committed. The linkage table must be updated to reflect that commitment, to support making the next commitment in the next cycle be based on clear and complete information.

The pick of the new composite is the first pick of the linker, and the drop of the combined composite is the last drop of the linkee. Both have windows and addresses. The service time for the combined composite is calculated by the ETA of the composite's drop minus the ETA of the composite's pick. The wheelchair client count is the bigger count between linker and linkee. The ambulatory count is the bigger count between linker and linkee.

Method for Global-View Chaining

The number of packets is significantly smaller than the number of original trips. For test trip sets of 25,000 trips, the packeter has been seen to build packets with up to four member trips.

Chaining( ):

If there are any new Heads
For each Head, identify the set of routes with R_STATUS=IN it can be assigned to.
If a Head has no such route, put it on the wait list (set C_STATUS=WAITLIST).
Pick a Head $H_X$ with C_STATUS=IN to assign to a route by HSF_C1 below.
Pick a Route $R_Y$ with R_STATUS=IN for $H_X$ to be assigned to by HSF_C2 below.
Make the assignment of $H_X$ to $R_Y$—set C_RouteID to $R_Y$ and set $R_Y$'s R_STATUS=OUT.
Update the set of routes each remaining head can be assigned to ($R_Y$ not available).
If there are any heads left, go to Step b.
NOTE: Below, only consider composites with C_STATUS=IN.
While there are still linkages in Linkage Table:
Pick a Linker $C_H$ with Linkees that is assigned to a Route by HSF_C3 below.
Pick a Linkee $C_T$ for $C_H$ by HSF_C4 below.
Add $C_T$'S C_Packet_Set of 1 packet to end of $C_H$'S C_Packet_Set, and update C_PK_Count.
Update $C_H$'S key attributes (the order of packets in C_Packet_Set is in "manifest" time order).
C_Pick and C_Drop
C_ETA_St and C_ETA_Ed
C_Span
C_WC and C_Amb
Mark $C_T$'s C_STATUS=OUT and set row Table[$C_T$,]=−1 and column Table[,$C_T$]=−1 for ConnectiveDeadhead and ConnectiveWait.
Update row Table[$C_H$,] and column Table[,$C_H$]: if not −1, re-test to see if still not −1 (if −1, it is still −1).
If there are any linkages left in the Linkage Table, go to Step 1.

HSF_C1—Select Head:
Prefer heads with most packets (C_PK_Count).
Prefer heads with earliest pick ETA (C_ETA_St).
Prefer heads with most wheelchair seats required (C_WC).
Pick one.

HSF_C2—Select Route for head:
Prefer routes with least deadhead to head (dynamically calculated).
Prefer routes with least wait time at head (dynamically calculated).
Prefer routes with no wheelchair capacity (R_WC).
Pick one.

HSF_C3—Select Linker $C_H$:
Prefer linker with earliest pick ETA (C_ETA_St).
Prefer linker with most wheelchair seats required (C_WC).
Prefer linker with most packets (C_PK_Count).
Prefer linker with fewer candidate linkees (dynamically calculated).
Pick one.

HSF_C4—Select Linkee $C_T$:
Prefer linkee with most wheelchair seats required (C_WC).
Prefer linkee with most packets (C_PK_Count).

Prefer linkee with minimum ConnectiveDeadhead.
Prefer linkee with minimum ConnectiveWait.
Prefer linkee with fewer candidate linkers (dynamically calculated).
Pick one.

When chaining stops, all composites with C_STATUS=WAITLIST are on the wait list. All Composites that with C_STATUS=IN are routes. The manifest for each route is in the membership C_Packet_Set, sequenced in time order. By expanding each such packet into its LIFO sequence of stops (order each packet's Packet_Set by T_Length descending to generate its LIFO sequence of stops), the manifest of trip stops is recovered (FIG. 10).

Customer Service Issues Addressed

Customers ride too long—This is precluded by the Packet Patterns. For example, for Common-Pick Packets, since the trips are headed in the same direction and the pick time windows overlap, the rides cannot be overly long. The fact that the ETA's are controllably in the middle of the time windows is proof that the ride times for all member trips cannot be overly long. Since packet integrity is untouched during chaining, the ride times of member trips are locked and stay the same throughout the rest of the scheduling process.

"Driving past my stop"—This is precluded by the Packet Patterns. For example, for On-the-Way Packets, the pick and drop of the guest trip are within the rectangle defined by the host pick & drop addresses. Common-Drop packets are constructed recursively by testing that Trip1 covers Trip2, so Trip2's pick & drop are within the rectangle defined by the T1's pick & drop addresses. Since packet integrity is untouched during chaining, the sequence of stops of the packet is locked and stays the same throughout the rest of the scheduling process.

On-Time Performance Issues Addressed

ETA's late in the time window—This is precluded by the packet patterns. Each packet pattern explicitly constructs the sequence of stops and tests to insure that every ETA has a minimum buffer to the end of its time window. Since packet integrity is untouched during chaining, the ETA's of member stops are locked and stay the same throughout the rest of the scheduling process.

Long Deadheads—This is precluded by the explicit chaining control parameter MaxDeadhead=the maximum allowed connective deadhead miles to link two composites (and therefore packets). The longest allowable deadhead is explicitly specified by the service provider.

Efficiency Issues Addressed

Driving a long way to make a pick—This is precluded by both the packet patterns and the explicit chaining control parameter MaxDeadhead.

Sending 2 vehicles when 1 is enough—This is precluded by the packet patterns. Trips that belong together are put together in a packet pattern before considering which route to assign the packet to.

Over-packed and under-packed Routes—Over-packed Routes are precluded by both the packet patterns and the chaining control parameter MinWait. The packets are all individually well-packed with ETA's in the middle of their time windows. MinWait=the minimum required wait time at the prospective linkee pick to link two composites (and therefore Packets). So any route produced by the scheduling process cannot have tight connections with no margin for error. Under-packed routes are precluded by the chaining control parameter MaxWait. The longest allowable idle time gap is explicitly specified by the service provider.

Computational Advantage

In the "Trip by Trip Insertion" method, all trips are candidates for the next insertion. In building routes, the travel time source may be called on to calculate the travel time from any candidate trip's pick and drop to any onboard route stop when deciding their best Insertion points. This is on the order of having access to a very large stop to stop matrix with an upper bound of 50,000 addresses X 50,000 addresses to build routes (in fact, there are fewer addresses, since several trips may want to go the senior center or a medical complex, etc.). But packeting only considers a Cluster_Set of trips at a time. Since Cluster_Sets are typically less than 30 trips, the stop to stop matrix is at most 60 addresses X 60 addresses to build packets. This contributes to the method of the disclosed technology being an order of magnitude faster than the "Trip by Trip Insertion", when benchmarked on a common laptop computer.

Analogically, instead of solving a giant 25,000 trip puzzle, packeting solves thousands of small puzzles of up to 30 trips at most.

To insert a new trip onto a route with 20 stops already scheduled, the pick can be inserted in 21 candidate insertion points (before each Stop plus after the last Stop). For the pick's $1^{st}$ candidate insertion point, the drop can be inserted in 21 candidate insertion points as well—it must be after the pick. For the pick's $2^{nd}$ candidate insertion point, the drop can be inserted in 20 candidate insertion points as well, and so on. So there are 21+20+19+ . . . +1=231 possible insertion pairs to test for both legality and the "best" insertion pair by quality metrics. Inserting a $2^{nd}$ new trip onto the route now with 22 stops already scheduled, there are 23+22+ 21+ . . . +1=276 possible insertion pairs. Inserting a $3^{rd}$ new trip onto the route now with 24 stops already scheduled, there are 25+24+23+ . . . +1=325 possible insertion pairs.

To insert a new packet of 3 trips onto a route with 20 stops already scheduled, note that the 20 stops may be represented by 10 scheduled packets. The new packet can be positioned in only 11 candidate insertion points (before each Packet, and after the last Packet) to test for both legality and the "best" insertion by quality metrics. Compare the 11 candidate insertions for a packet of 3 trips versus the 231+276+ 325=832 insertion pairs for 3 individual Trips. This illustrates another contribution to the method of this disclosed technology being an order of magnitude faster than the "Trip by Trip Insertion", when benchmarked on a common laptop computer.

In benchmarking the new program based on the disclosed technology against a "Trip by Trip Insertion" product also using HFS's to make decisions, the runtime for 5 days of approximately 25,000 trips each for the new program averaged 144 seconds=2.4 minutes to optimize using a 5-year old desktop computer with a single processor. The "Trip by Trip Insertion" product averaged 743 seconds=12.4 minutes to optimize on the multi-core production server. The new program ran 5 times faster on a slower computer and produced significantly better metrics (see below).

Additional Advantages

In the "Trip by Trip Insertion" method, the wait list is composed of single trips. In the method of this technology, the wait list is composed of packets which are efficient pieces of work. These can be more productively bid out to non-dedicated resources such as brokers, taxis, and TNC's like Uber and Lyft, perhaps at a discounted cost.

Loner trips are isolated in time or geography from the other trips in the Trip set to be scheduled, and are the costliest trips for the service provider. In the "Trip by Trip Insertion" method, unless they are explicitly tested for, they may be selected as the best trip to schedule next. Loner trips by definition require longer deadheads to drive to the pick and drive from the drop, resulting in poor use of service miles and service time. In the method of this technology, loner trips naturally become packets of a single trip. The chaining control parameter MaxDeadhead will preclude loner packets that are too remote from making it onto any route. The strategy to select the best linkee for the best linker will avoid loner packets by the filter "Prefer Linkee with fewest deadhead miles". Loners properly land on the wait list, and are sent to non-dedicated resources, which do not charge for deadhead to the pick or from the drop.

Benchmark—One Week of Production Test Data Sets

An "apples to apples" comparison between the HFS-based "Trip by Trip Insertion" product in use by a large Northeastern U.S. city and an engine based on the disclosed technology was conducted over 5 consecutive weekdays. The results are summarized in the tables below:

| Engine | Trips | Routes | Wait | Hours | Miles | Trips/Hr. | Runtime |
|---|---|---|---|---|---|---|---|
| Trips Monday | | | | | | | |
| Prior Art | 22711 | 1933 | 32 | 15004 | 144767 | 1.01 | 648 sec. |
| Disclosed technology | 22711 | 1765 | 91 | 12413 | 128321 | 1.17 | 125 sec. |
| Improvement | | 168 | −59 | 2591 | 16446 | .16 | 523 sec. |
| % Improvement | | 8.7% | | 17.3% | 11.4% | | |

| Engine | Trips | Routes | Wait | Hours | Miles | Trips/Hr. | Runtime |
|---|---|---|---|---|---|---|---|
| Trips Tuesday | | | | | | | |
| Prior Art | 24377 | 1959 | 53 | 15577 | 152311 | 1.04 | 756 sec. |
| Disclosed technology | 24377 | 1883 | 79 | 13435 | 135820 | 1.17 | 148 sec. |
| Improvement | | 76 | −26 | 2142 | 16491 | .13 | 608 sec. |
| % Improvement | | 3.9% | | 13.8% | 10.8% | | |

| Engine | Trips | Routes | Wait | Hours | Miles | Trips/Hr. | Runtime |
|---|---|---|---|---|---|---|---|
| Trips Wednesday | | | | | | | |
| Prior Art | 24040 | 1969 | 40 | 15578 | 151902 | 1.02 | 731 sec. |
| Disclosed technology | 24040 | 1833 | 111 | 13140 | 133478 | 1.16 | 145 sec. |
| Improvement | | 136 | −71 | 2438 | 18424 | .14 | 586 sec. |
| % Improvement | | 6.9% | | 15.7% | 12.1% | | |

| Engine | Trips | Routes | Wait | Hours | Miles | Trips/Hr. | Runtime |
|---|---|---|---|---|---|---|---|
| Trips Thursday | | | | | | | |
| Prior Art | 24734 | 2013 | 67 | 16064 | 157906 | 1.04 | 829 sec. |
| Disclosed technology | 24734 | 1921 | 70 | 14967 | 140524 | 1.16 | 155 sec. |
| Improvement | | 92 | −3 | 1097 | 17382 | .12 | 674 sec. |
| % Improvement | | 4.6% | | 6.8% | 11.0% | | |

| Engine | Trips | Routes | Wait | Hours | Miles | Trips/Hr. | Runtime |
|---|---|---|---|---|---|---|---|
| Trips Friday | | | | | | | |
| Prior Art | 24093 | 1919 | 59 | 15530 | 154855 | 1.05 | 751 sec. |
| Disclosed technology | 24093 | 1813 | 93 | 13304 | 137451 | 1.18 | 148 sec. |
| Improvement | | 106 | −34 | 2226 | 17404 | .13 | 603 sec. |
| % Improvement | | 5.5% | | 14.3% | 11.2% | | |

Note: The disclosed scheduling engine did have more wait listed trips than the prior art scheduling (71 more wait listed trips represent 0.3% of the total trips to schedule).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

Figure 15:
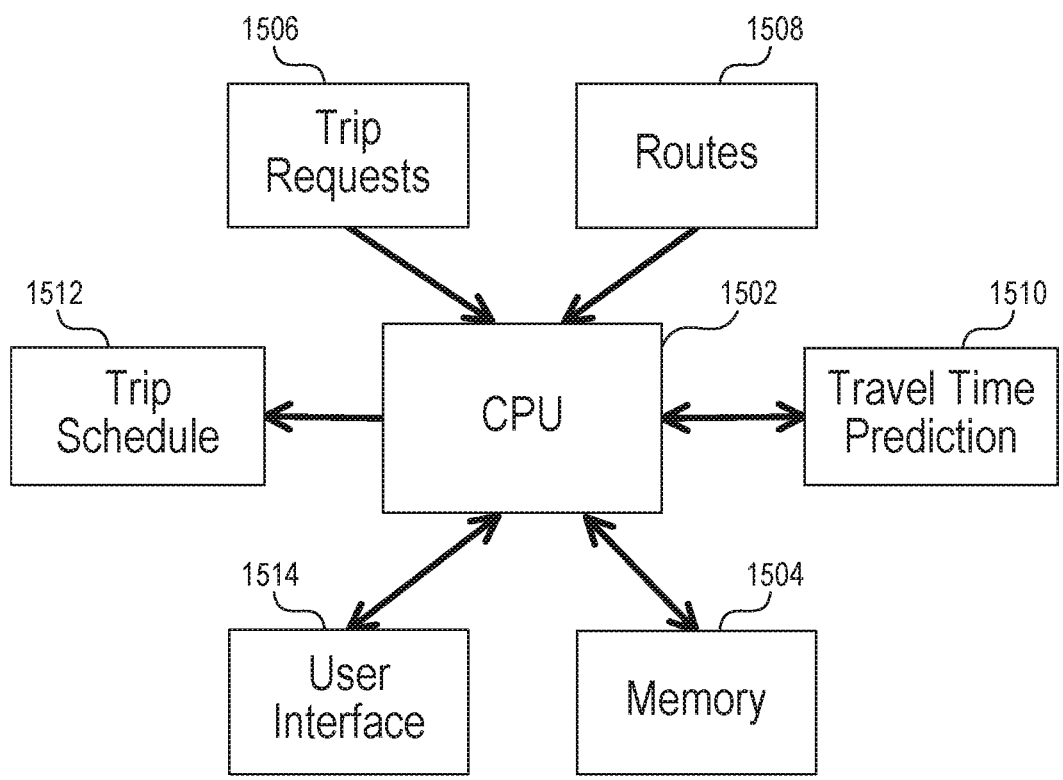
FIG. 15 shows an exemplary computer system that can produce route schedules for requested trips in accordance with the disclosed technology.

FIG. 15 illustrates a representative computer system of the type with which the disclosed technology can be implemented. The computer includes a processor 1502 that is configured to execute programmed instructions stored on a computer readable media or stored in a memory 1504 to receive and process trip requests and to assign the requests onto vehicle routes. The computer system may include a web server (not shown) that is configured to provide a web page into which users can enter trip requests. In other embodiment, the processor executes instructions to receive a list of trip requests 1506 that are compiled by another computer system. The processor also receives data 1508 regarding a number of routes and vehicles in a fleet that is available to service the trip requests.

The processor interacts with a travel time prediction system 1510 (or implements a travel time prediction algorithm) such as discussed in U.S. Pat. No. 10,094,676 to determine the expected length and duration of each requested trip. In addition, the computer system produces hard or electronic copies of trip schedules 1512 that inform the driver of each vehicle in the system where the various pick up and drop off locations are for each trip that is scheduled on their vehicle and the order in which the trips should be serviced. In some embodiments, the processor is connected to other processors via a wired or wires communication link (e.g. LAN, WAN, Internet, 802.11 etc.) not shown). A user interface 1514 including keyboard, mouse, touch screen or other input devices is provided for an operator to view the trip schedules, adjust ride quality metrics, trip combining heuristic rules and perform other functions.

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the disclosed technology have been described herein for purposes of illustration, but that various modifications may be made without deviating from the scope of the invention. Accordingly, the invention is not limited except as by the appended claims.

I claim:

1. A route programming computer system, comprising:
a processor that is configured to execute programmed instructions to:
access a trip attributes table stored in a computer memory, the trip attributes table including trip parameters for each of a plurality of trips;
access a vehicle attributes table stored in the computer memory, the vehicle attributes table including vehicle data for each of a plurality of vehicles upon which the trips can be scheduled;
generate a plurality of packets,
wherein each of the plurality of packets includes one or more of the plurality of trips such that each trip in the packet meets one or more defined quality criteria and can be serviced by at least one of the plurality of vehicles, and
wherein, for each of the plurality of packets, one of the plurality of the trips can be added to the packet after the packet is generated; and
combine two or more of the plurality of packets into a route for one of the plurality of vehicles.

2. The route processing system of claim 1, wherein the processor is configured to execute the programmed instructions to determine a direction of travel for each of the plurality of trips and to group one or more of the plurality of trips that have pickup locations that are within a predetermined geographic distance of each other and that are travelling in the same direction of travel to generate at least one of the plurality of packets.

3. The route processing system of claim 1, wherein the processor is configured to execute the programmed instructions to determine a direction of travel for each of the plurality of trips and to group one or more of the plurality of trips that have drop off locations that are within a predetermined geographic distance of each other and that are arriving from the same direction of travel to generate at least one of the plurality of packets.

4. The route processing system of claim 1, wherein the processor is configured to execute the programmed instructions determine a direction of travel for each of the plurality of trips and to group one or more of the plurality of trips that are travelling in the same direction of travel and that do not add more than a defined maximum extra distance to generate at least one of the plurality of packets.

5. A route programming computer system, comprising:
a processor that is configured to execute programmed instructions to:
access a trip attributes table stored in a computer memory, the trip attributes table including trip parameters for each of a plurality of trips;
access a vehicle attributes table stored in the computer memory, the vehicle attributes table including vehicle data for each of a plurality of vehicles upon which the trips can be scheduled;
generate a plurality of packets,
wherein each of the packets includes one or more of the trips such that each trip in the packet meets one or more defined quality criteria and can be serviced by at least one of the vehicles; and
wherein, for each of the packets, none of the trips can be added to the packet after the packet is generated; and
chain at least a first packet and a second packet of the plurality of packets together into a route for one of the vehicles, wherein the route specifies that the one of the vehicles is scheduled to service the first packet at least partially before the second packet.

* * * * *

UNITED STATES PATENT AND TRADEMARK OFFICE
CERTIFICATE OF CORRECTION

PATENT NO. : 10,955,246 B2
APPLICATION NO. : 16/853648
DATED : March 23, 2021
INVENTOR(S) : William P. C. Ho It is certified that error appears in the above-identified patent and that said Letters Patent is hereby corrected as shown below:

On the Title Page

Item (56), in Column 2, under "Other Publications", Line 3, delete "Prolifes;" and insert -- Profiles; --, therefor.

Item (74), in Column 2, in "Attorney, Agent, or Firm", Line 1, delete "Cole" and insert -- Coie --, therefor.

In the Specification

In Column 3, Line 52, delete "t5." and insert -- T5. --, therefor.

In Column 11, Line 22, delete "requested" and insert -- requested) --, therefor.

In Column 13, Line 3, delete "Cluster-Set." and insert -- Cluster_Set. --, therefor.

In Column 13, Line 15, delete "ridetime" and insert -- ride time --, therefor.

In Column 14, Line 32, delete "MAX Length" and insert -- MAX_Length --, therefor.

In Column 14, Lines 32-33, delete "MAX Length" and insert -- MAX_Length --, therefor.

In Column 14, Line 40, delete "Tv" and insert -- $T_Y$ --, therefor.

In Column 15, Line 27, delete "RouteNehicle" and insert -- Route/Vehicle --, therefor.

In the Claims

In Column 24, Line 9, in Claim 1, delete "one" and insert -- none --, therefor.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*

In Column 24, Line 10, in Claim 1, after "of" delete "the".

In Column 24, Line 32, in Claim 4, before "determine" insert -- to --.